(12) United States Patent
Labelle

(10) Patent No.: US 12,291,094 B2
(45) Date of Patent: May 6, 2025

(54) STEPPED PLANETARY SINGLE BEARING CARRIER SUPPORT

(71) Applicant: LINAMAR CORPORATION, Guelph (CA)

(72) Inventor: Chad Labelle, Livonia, MI (US)

(73) Assignee: Linamar Corporation, Guelph (CA)

( * ) Notice: Subject to any disclaimer, the term of this patent is extended or adjusted under 35 U.S.C. 154(b) by 186 days.

(21) Appl. No.: 18/019,850

(22) PCT Filed: Aug. 6, 2021

(86) PCT No.: PCT/US2021/044929
§ 371 (c)(1),
(2) Date: Feb. 6, 2023

(87) PCT Pub. No.: WO2022/032088
PCT Pub. Date: Feb. 10, 2022

(65) Prior Publication Data
US 2023/0278408 A1 Sep. 7, 2023

Related U.S. Application Data

(60) Provisional application No. 63/062,011, filed on Aug. 6, 2020.

(51) Int. Cl.
*B60K 17/16* (2006.01)
*B60K 1/00* (2006.01)
(Continued)

(52) U.S. Cl.
CPC ...... *B60K 17/165* (2013.01); *B60K 2001/001* (2013.01); *F16H 2048/082* (2013.01);
(Continued)

(58) Field of Classification Search
CPC .. B60K 1/00; B60K 2001/001; B60K 17/165; H02K 7/006; H02K 7/116;
(Continued)

(56) References Cited

U.S. PATENT DOCUMENTS 5,779,588 A * 7/1998 Mann .................. B66B 11/0453
475/331
6,401,850 B1 * 6/2002 Bowen ..................... B60K 6/26
903/910
(Continued)

FOREIGN PATENT DOCUMENTS

DE 19858033 A1 * 6/2000 ............. B60K 17/20
EP 3519221 8/2019
WO 2016135703 9/2016

*Primary Examiner* — Ernesto A Suarez
(74) *Attorney, Agent, or Firm* — Miller Canfield

(57) ABSTRACT

A coaxial electrified drive axle is provided for a vehicle. The coaxial electrified drive axle has an electric motor connected to a gear box housing containing a stepped planetary gear set operatively coupling a drive shaft of the electric motor to a linkshaft and an output shaft through a differential assembly. The differential assembly is contained within a carrier which also supports the planet gears through planet pins. The carrier is supported by a single carrier support bearing. The drive shaft, the linkshaft, and the output shaft are coaxial and share a common axis of rotation.

11 Claims, 4 Drawing Sheets

(51) Int. Cl.
  *F16H 48/08*    (2006.01)
  *F16H 48/40*    (2012.01)
  *F16H 57/08*    (2006.01)
(52) U.S. Cl.
  CPC .. *F16H 2048/085* (2013.01); *F16H 2048/405* (2013.01); *F16H 57/082* (2013.01)
(58) Field of Classification Search
  CPC .................... F16H 48/08–2048/087; F16H 48/38–2048/426; F16H 57/08–2057/085
  See application file for complete search history.

(56) References Cited

U.S. PATENT DOCUMENTS

| | | | |
|---|---|---|---|
| 8,508,090 B2 * | 8/2013 | Tanaka | H02K 7/083 |
| | | | 192/113.32 |
| 11,274,740 B2 * | 3/2022 | Wilson | F16H 57/0447 |
| 11,555,537 B2 * | 1/2023 | Oshidari | F16H 37/082 |
| 11,971,094 B2 * | 4/2024 | Schaefer | F16D 1/101 |
| 2017/0307055 A1 | 10/2017 | Scharr et al. | |

* cited by examiner

STEPPED PLANETARY SINGLE BEARING CARRIER SUPPORT

CROSS-REFERENCE TO RELATED APPLICATIONS

This application claims priority to and all the benefits of U.S. Provisional Application 63/062,011, filed Aug. 6, 2020, and entitled "Stepped Planetary Single Bearing Carrier Support", the disclosure of which is hereby incorporated by reference in its entirety.

BACKGROUND OF THE INVENTION

1. Field of the Invention

The present invention relates to a single speed stepped planetary electrified transmission. More specifically, the present invention relates to a single speed stepped planetary electrified transmission that is supported by a single carrier support bearing.

2. Description of Related Art

Many vehicles today have an electric drive comprising an electric motor operatively coupled to an axle gearbox in lieu of and/or in addition to an internal combustion engine. An axle gearbox operatively coupled to an electric motor is generically described as an electrified drive axle. The electrified drive axle is typically operatively coupled to one or more wheels for propelling the vehicle.

One type of electrified drive axle is a single speed stepped planetary coaxial electrified drive axle. The coaxial electrified drive axle typically includes an electric motor having a motor shaft that is coaxial with a linkshaft and a differential output shaft. The linkshaft is typically operatively coupled to the motor shaft and operatively coupled to one wheel of the vehicle. In addition, the motor shaft is operatively coupled through a differential assembly to the differential output shaft. Typically, the differential output shaft is operatively coupled to a second wheel of the vehicle. In certain electrified drive axles, the motor shaft of the electric motor is operatively coupled to the differential assembly through a stepped planetary gear set.

Typically, the electric motor of the coaxial electrified drive axle includes a stator and a rotor contained and supported within a housing. The motor shaft is supported and contained by opposing inboard motor bearings inserted into the housing. One end of the motor shaft is fixedly coupled to a sun gear of a stepped planetary transmission. The stepped planetary transmission includes a plurality of stepped planetary gears attached to a carrier through needle bearings and planetary pins. Typically, the carrier is supported by an inboard carrier support bearing and an outboard carrier support bearing. During assembly, the inboard and outboard carrier support bearings can be preloaded to limit axial end play of the carrier. It is desirable to limit axial end play to minimize noise and vibration during use. Further, it is desirable to limit axial end play since axial end play may result in increased wear on the bearings during use.

However, it is desirable to reduce the cost of the coaxial electrified drive axle by eliminating the inboard carrier support bearing. Further, it is desirable to eliminate the inboard carrier support bearing and control axial fixation of the carrier in both directions with the outboard carrier support bearing while maintaining a minimal amount of axial end play within the outboard carrier support bearing. It is also desirable to potentially reduce the size of the coaxial electrified drive axle in the axial direction. In addition, it is desirable to maintain a desired amount of noise, vibration, and bearing wear when the coaxial electrified drive axle includes a single carrier support bearing.

SUMMARY OF THE INVENTION

The present invention relates a coaxial electrified drive axle for a vehicle having an electric motor connected to a gear box housing containing a stepped planetary gear set operatively coupling a drive shaft of the electric motor to a linkshaft and an output shaft through a differential assembly. The differential assembly is contained within a carrier that is supported by a single carrier support bearing. The drive shaft, the linkshaft, and the output shaft are coaxial and share a common axis of rotation.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
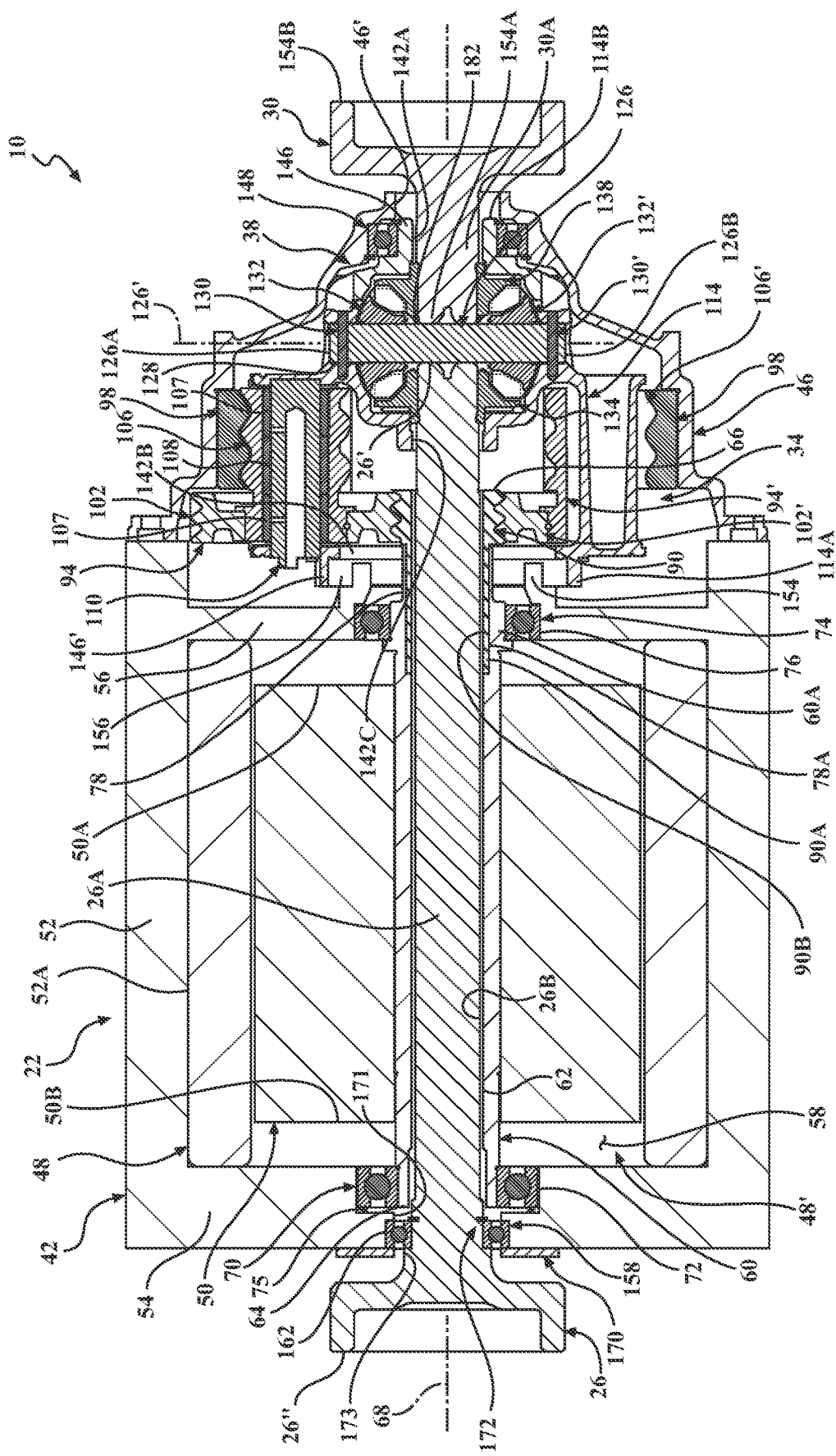
FIG. 1 is a cross-sectional view of a coaxial electrified drive axle having a single speed stepped planetary gear set with a single carrier support bearing, according to one embodiment of the present invention.

FIGS. 1 and 3-5 illustrate a coaxial electrified drive axle 10 having an electric motor 22 operatively coupled to a linkshaft 26 and an output shaft 30 through a single speed stepped planetary gear set 34 and a differential assembly 38, according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

FIG. 1 shows a cross-sectional view of the coaxial electrified drive axle 10 for a vehicle, showing the electric motor 22 having a motor housing 42 fixedly coupled to a gearbox housing 46, a stator 48, and a rotor 50. The motor housing 42 includes a generally cylindrical-shaped outer wall 52 extending between a first end wall 54 and an opposing second end wall 56. The outer wall 52, the first end wall 54, and the second end wall 56 of the motor housing 42 define an interior cavity 58 within the motor housing 42. The stator 48 is attached to an interior surface 52A of the outer wall 52 of the motor housing 42. A passageway 48' extends longitudinally through the stator 48.

Also shown in FIG. 1, the rotor 50 is positioned within the passageway 48' through the stator 48. In addition, the rotor 50 is fixedly coupled to a drive shaft 60 having a longitudinal bore 62 extending between opposing first and second drive shaft ends 64, 66. A longitudinal axis 68 of the drive shaft 60 defines an axis of rotation of the drive shaft 60 and attached rotor 50. The first drive shaft end 64 is supported and contained by a first outboard motor bearing 70 inserted into a recessed cavity 72 in the first end wall 54 of the motor housing 42. The second drive shaft end 66 is supported and contained by a second inboard motor bearing 74 inserted into a recessed cavity 76 in the second end wall 56 of the motor housing 42. In certain embodiments, the first outboard motor bearing 70 is a floating bearing supported in the recessed cavity 72 and preloaded by a motor bearing preload spring 75. In other embodiments, one or more of the first outboard motor bearing 70 and the second inboard motor bearing 74 is a fixed bearing.

In the embodiment shown in FIG. 1, a portion 60A of the drive shaft 60 adjacent the second drive shaft end 66 extends into and/or through an opening 78 in the second end wall 56 of the motor housing 42. The drive shaft 60 is essentially part of the rotor 50 in the embodiment shown in FIG. 1. However, in alternate embodiments, the drive shaft 60 is a separate component attached to and/or passing through the rotor 50. Further, in certain embodiments, the drive shaft 60 extends entirely through the rotor 50. In other embodiments, the drive shaft 60 is split into two short drive shafts with each of the short drive shafts extending from respective opposing ends 50A, 50B of the rotor 50 without passing entirely through the rotor 50.

Also shown in FIG. 1, the single speed stepped planetary gear set 34 and the differential assembly 38 are generally contained within and supported by the gearbox housing 46. The single speed stepped planetary gear set 34 includes a sun gear 90, a plurality of stepped planetary gears 94, 94', and a ring gear 98. Each of the plurality of stepped planetary gears 94, 94' include a driven planet gear 102, 102', a driving planet gear 106, 106', one or more radial needle bearings 107, and a planet pin 110 passing axially through the driven and driving planet gears 102, 102', 106, 106'. In some embodiments, the stepped planetary gears 94, 94' are supported to the planet pin 110 by a pair of radial needle bearings 107 separated by a sleeve 108. Further, certain embodiments include thrust washers at each end of the stepped planetary gears 94, 94' to support thrust loads against the carrier 114. Each of the planet pins 110 is mechanically coupled to a carrier 114. Each of the driven planet gears 102, 102' is meshingly engaged with the sun gear 90. Further, each of the driving planet gears 106, 106' is meshingly engaged with the ring gear 98.

A sun gear shaft 90A extends from the sun gear 90 aligned with the axis of rotation 68 of the sun gear 90, as shown in FIG. 1. The sun gear shaft 90A is generally cylindrically-shaped with a longitudinal bore 90B extending through both the sun gear shaft 90A and the sun gear 90. In the embodiment shown in FIG. 1, the longitudinal bore 62 through the drive shaft 60 includes a recessed inlet portion 78A sized and shaped to matingly engage with the sun gear shaft 90A. The longitudinal bore 90B extending through the sun gear shaft 90A is aligned with the longitudinal bore 62 through the drive shaft 60 when the sun gear shaft 90A is assembled with the drive shaft 60. More specifically, the longitudinal axis of the sun gear shaft 90A is generally aligned with the drive shaft axis of rotation 68. Rotation of the drive shaft 60 about the drive shaft axis of rotation 68 causes the sun gear 90 to rotate, which in turn causes the driven planet gears 102, 102' to rotate. Rotation of the driven planet gears 102, 102' cause each of the respective driving planet gears 106, 106' to rotate and travel along the ring gear 98, resulting in rotation of the carrier 114 about the drive shaft axis of rotation 68.

Also shown in FIG. 1, the differential assembly 38 includes a differential pin 126 inserted into a central passageway 128 through the carrier 114. Connecting pins 130, 130' fixedly couple opposing ends 126A, 126B of the differential pin 126 to the carrier 114. In the embodiment shown in FIG. 1, the differential pin 126 is generally cylindrically-shaped and extends in a longitudinal direction that is generally perpendicular to the axis of rotation 68 of the drive shaft 60.

In addition, the differential assembly 38, shown in FIG. 1, includes opposing first and second differential pinion gears 132, 132' as well as opposing inboard and outboard differential side gears 134, 138 mounted within the carrier 114. The opposing first and second differential pinion gears 132, 132' are meshingly engaged with both the inboard and outboard differential side gears 134, 138. Also, the opposing first and second differential pinion gears 132, 132' are mounted on the differential pin 126 and rotate relative to the differential pin 126. Further, the inboard and outboard differential side gears 134, 138 rotate relative to the carrier 114. Rotation of the carrier 114 about the drive shaft axis of rotation 68 results in rotation of the differential pin 126 about the drive shaft axis of rotation 68 causing the differential pinion gears 132, 132' to orbit about that same axis 68. In the event that the right and left hand wheels rotate at different speeds the differential side gears 134, 138 will also rotate at different speeds causing the differential pinion gears 132, 132' to also rotate about the longitudinal axis 126' of the differential pin 126.

As shown in FIG. 1, the carrier 114 extends between an inboard end 114A and an opposing outboard end 114B. An outboard opening 142A passes through outboard end 114B of the carrier 114 aligned with the drive shaft axis of rotation 68. Further, the outboard opening 142A in the carrier 114 is circumferentially bounded by an outboard rim 146. The outboard rim 146 is supported and contained within the gearbox housing 46 by a single carrier support bearing 148. As such, the carrier 114 is rotatably supported within the gearbox housing 46 by the single carrier support bearing 148. In addition, the carrier 114 includes an inboard opening 142B passing through the inboard end 114A of the carrier 114 aligned with the drive shaft axis of rotation 68. Optionally, an inboard rim 146' extends circumferentially around the inboard opening 142B in the carrier 114.

In the embodiment shown in FIG. 1, a motor housing inboard rim 154 extends circumferentially around the opening 78 in the second end wall 56 of the motor housing 42. The carrier inboard rim 146' is radially spaced apart from the motor housing inboard rim 154 forming a cavity 156. In certain embodiments, one or both of the carrier inboard rim 146' and motor housing inboard rim 154 are omitted. As shown in FIG. 1, the inboard end 114A is unsupported with respect to the motor housing 42. The carrier 114 is radially supported by the housing 38 through the stepped planetary gears 94, 94' and the ring gear 98. The single carrier support bearing 148 handles axial loads in the carrier 114 as well as providing additional radial support.

Referring to FIG. 1, a first shaft end 26' of the linkshaft 26 is driveably coupled to the inboard differential side gear 134 and aligned with the axis of rotation of the inboard differential side gear 134. The linkshaft 26 passes through a central opening 142C in the carrier 114, extends through the longitudinal bore 90B in the sun gear 90 and the sun gear shaft 90A, and extends through the longitudinal bore 62 in the drive shaft 60. The linkshaft 26 has an opposing second shaft end 26" configured to be operatively coupled to a first wheel of the vehicle. The linkshaft 26 has a generally cylindrical section 26A that extends in a longitudinal direction generally aligned with the axis of rotation 68 of the drive shaft 60. Further, the generally cylindrical section 26A of the linkshaft 26 has an outer surface 26B having a diameter less than an inner diameter of the longitudinal bore 62 through the drive shaft 60.

The output shaft 30 has a first shaft end 154A fixedly coupled to the outboard differential side gear 138, as shown in FIG. 1. The output shaft 30 has a generally cylindrical-shaped portion 30A extending in a longitudinal direction generally aligned with the drive shaft axis of rotation 68. The cylindrical-shaped portion 30A of the output shaft 30 extends through the outboard opening 142A in the carrier 114 and through an outboard opening 46' in the gearbox housing 46. The output shaft 30 has an opposing second shaft end 154B configured to be operatively coupled to an opposing second wheel of the vehicle.

In the embodiment shown in FIG. 1, rotation of the inboard and outboard differential side gears 134, 138 about the drive shaft axis of rotation 68 result in rotation of the linkshaft 26 and the output shaft 30, respectively, as well rotation of operatively coupled first and second wheels of the vehicle. During use, the vehicle is propelled by the coaxial electrified drive axle 10 rotating the linkshaft 26 and the output shaft 30.

Figure 4:
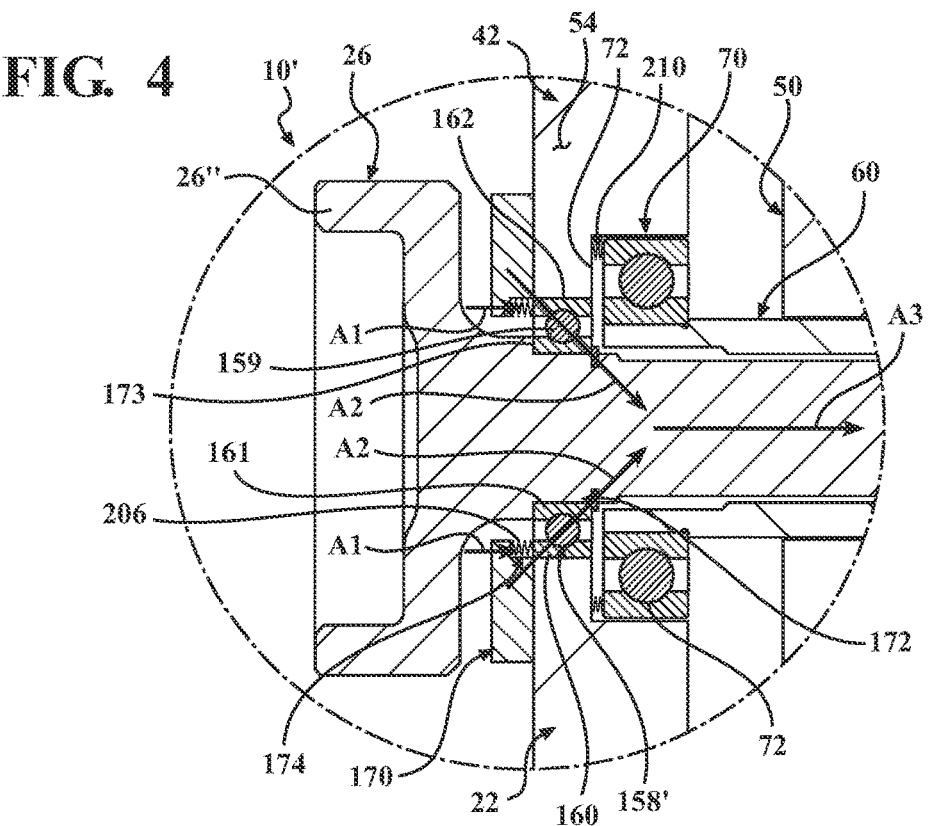
FIG. 4 is an enlarged view of portion 4 of FIG. 3, showing a linkshaft bearing preload spring preloading the linkshaft bearing against the single carrier support bearing through a linkshaft, a differential assembly, and a carrier.

As shown in FIG. 1, the linkshaft 26 is supported and contained within the motor housing 42 by a linkshaft bearing 158 positioned near the first shaft end 26' of the linkshaft 26. As shown in FIG. 4, the linkshaft bearing 158 typically includes a plurality of rolling elements 159 supported between an outer ring 160 and an inner ring 161. The linkshaft bearing 158 is inserted into a first passageway section 162 in the first end wall 54 of the motor housing 42. In the embodiment shown in FIG. 1, the linkshaft bearing 158 is retained in the housing 42 between an end cover 170 fixedly coupled to the motor housing 42 and a shoulder 171 in motor housing 42. The linkshaft 26 is axially fixed to the linkshaft bearing 158 by a shoulder 173 on the left side and a retaining ring 172 attached to the linkshaft 26 on the right side, as viewed in FIG. 1. In certain embodiments, the linkshaft bearing 158 is a fixed bearing. In other embodiments, such as shown in FIG. 4, the linkshaft bearing 158' is a floating bearing preloaded by a linkshaft bearing preload spring 174 positioned between an outer ring 160 of the linkshaft bearing 158' and one of the motor housing 42 and the end cover 170.

Figure 2:
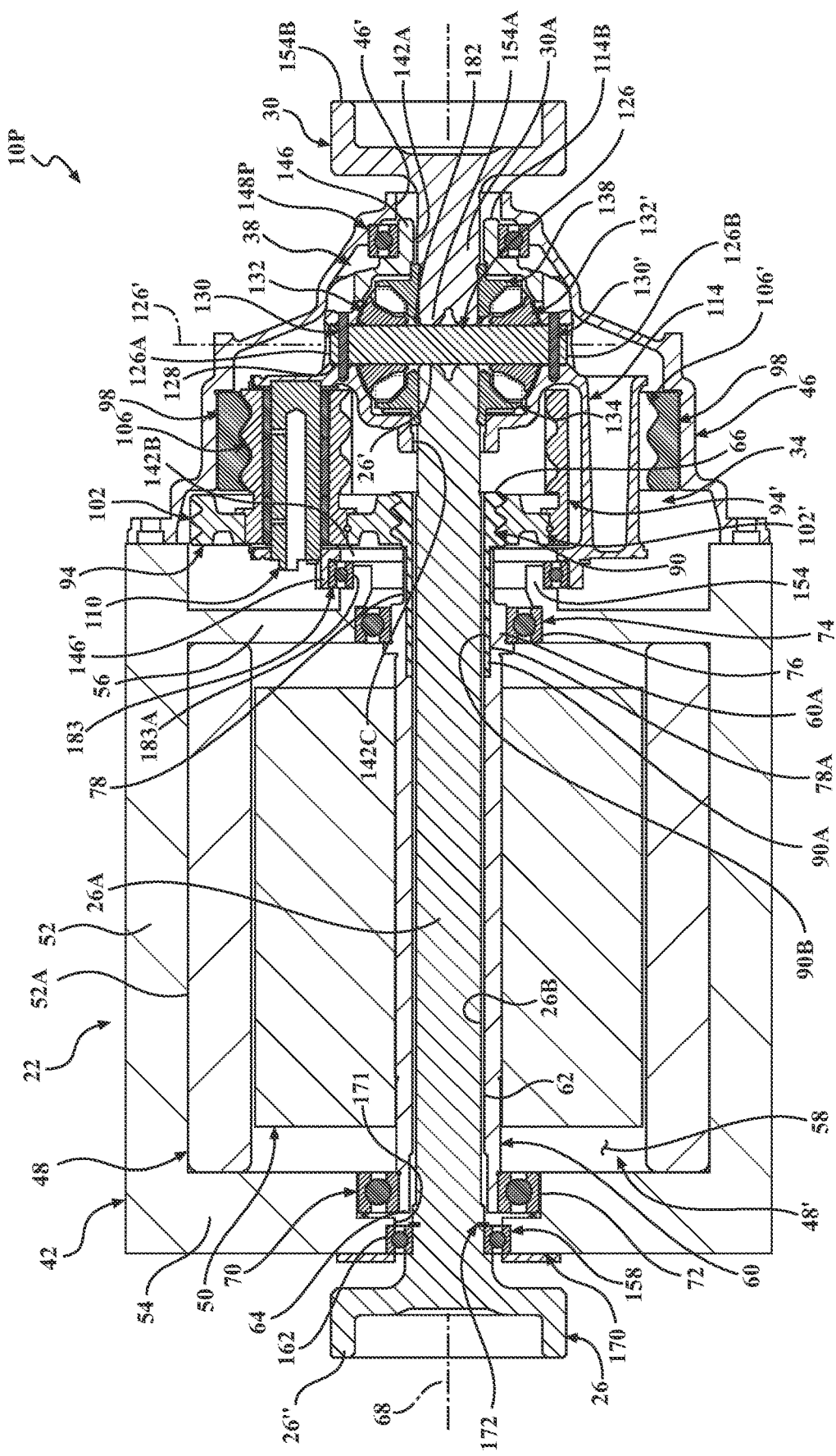
FIG. 2 is a cross-sectional view of a known coaxial electrified drive axle having a single speed stepped planetary gear set, an inboard carrier support bearing, and an outboard carrier support bearing.

A known coaxial electrified drive axle 10P is shown in FIG. 2. Elements in FIG. 2 that are the same or similar to those used above in the embodiment shown in FIG. 1 have the same reference numbers for simplicity. Only the significant differences in relation to FIG. 1 are highlighted below. One difference substantially involves an inboard carrier support bearing 183 coupled between the motor housing 42 and the carrier 114.

As shown in FIG. 2, the linkshaft 26 of the known coaxial electrified drive axle 10P is supported and contained within the motor housing 42 by a linkshaft bearing 158 positioned near the first shaft end 26' of the linkshaft 26. The linkshaft bearing 158 is pressed into a first passageway section 162 in the motor housing 42. Further, the linkshaft bearing 158 is retained between an end cover 170 fixedly coupled to the motor housing 42 and a shoulder 171 in motor housing 42.

In the conventional architecture shown in FIG. 2, the linkshaft 26 is axially fixed to either the motor housing 42 or to the carrier 114. The linkshaft bearing 158 is typically selected to be a fixed bearing (i.e., a non-floating bearing) when the linkshaft 26 is axially fixed to the motor housing 42. Alternatively, when the linkshaft bearing 158 is a floating bearing, the linkshaft 26 is typically axially fixed to the carrier 114 by inserting a c-clip around the linkshaft 26 near and/or through the inboard differential side gear 134 to limit axial play. The c-clip restricts axial movement between the linkshaft 26 and the inboard differential side gear 134. However, the linkshaft 26 does not provide axial fixation of the carrier 114 in the conventional architecture 10P even when the c-clip is inserted.

Conventionally, the carrier 114 is supported by a pair of bearings 148P, 183, as shown in the known coaxial electrified drive axle 10P of FIG. 2. In more detail, the outboard opening 142A in the carrier 114 is bounded by an outboard rim 146. The outboard rim 146 is supported and contained within the gearbox housing 46 by an outboard carrier support bearing 148P. In addition, the carrier 114 includes an inboard rim 146' extending circumferentially around an inboard opening 142B in the carrier 114. A motor housing inboard rim 154 extends circumferentially around the opening 78 in the second end wall 56 of the motor housing 42. The inboard carrier support bearing 183 is positioned between the motor housing inboard rim 154 and the inboard rim 146' on the carrier 114, providing support for the inboard end 114A of the carrier 114. The inboard carrier support bearing 183 is usually relatively large since during assembly the sun gear 90 is passed through a bore 183A extending axially through the inboard carrier support bearing 183. The inboard carrier support bearing 183 is typically one of the higher cost bearings in the known coaxial electrified drive axle 10P due to its relatively large size. Thus, it is desirable to omit the inboard carrier support bearing 183 to reduce the overall cost of the coaxial electrified drive axle 10P.

In the conventional architecture shown in FIG. 2, the inboard and outboard carrier support bearings 183, 148P can be preloaded. However, as shown in FIG. 1, removal of the inboard carrier support bearing 183 also eliminates the option to preload the inboard carrier support bearing 183. Thus, all end play would be handled by the outboard carrier support bearing 148P if the inboard carrier support bearing 183 is removed. Further, the lack of the inboard carrier support bearing 183 and the resultant loss of the opportunity to preload the inboard carrier support bearing 183 produces higher carrier 114 end play. Increased end play in the carrier 114 can result in noise, vibration, and harshness sound issues with the coaxial electrified drive axle 10.

The embodiment shown in FIG. 1 lacks the conventional inboard support bearing 183 included in the known coaxial electrified drive axle 10P of FIG. 2. In the first embodiment shown in FIG. 1, the single carrier support bearing 148 is preferably a fixed bearing in order to support the carrier 114 when the inboard carrier support bearing 183 of the conventional architecture is omitted. Preferably, the single carrier support bearing 148 is a fixed four point contact ball bearing since fixed four point contact ball bearings can support a limited radial load in addition to supporting an axial load. Typically, a four point contact ball bearing is a single row angular contact ball bearing with a raceway designed to support both radial and axial loads with less end play than a deep groove ball bearing. Since all end play is handled by the single carrier support bearing 148 in the embodiment shown in FIG. 1, the total end play can be reduced while maintaining package size by selecting a four point contact ball bearing in lieu of a deep groove ball bearing.

Figure 3:
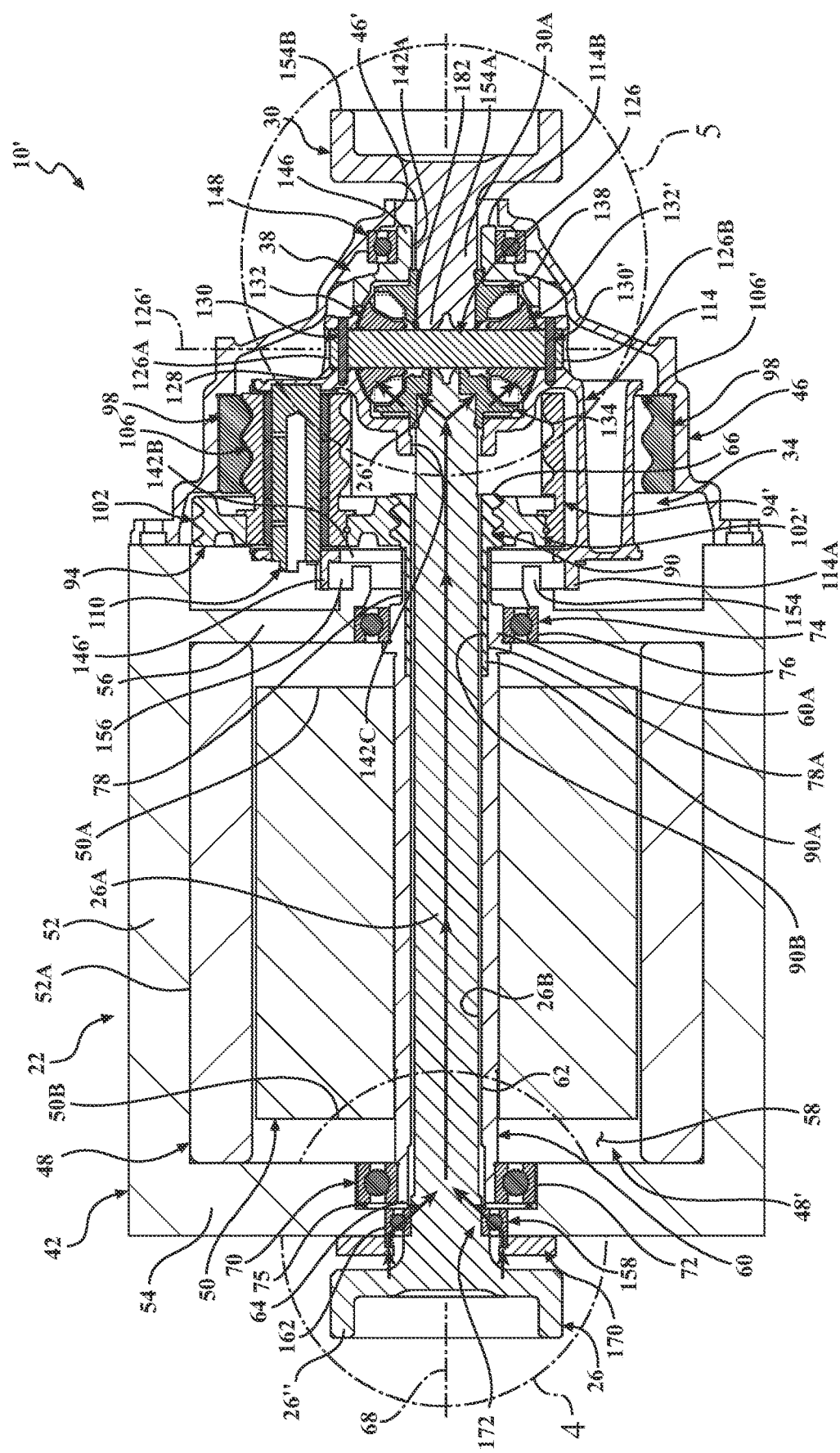
FIG. 3 is a cross-sectional view of a second embodiment of the coaxial electrified drive axle of FIG. 1, having a floating linkshaft bearing and a preload spring.
Figure 5:
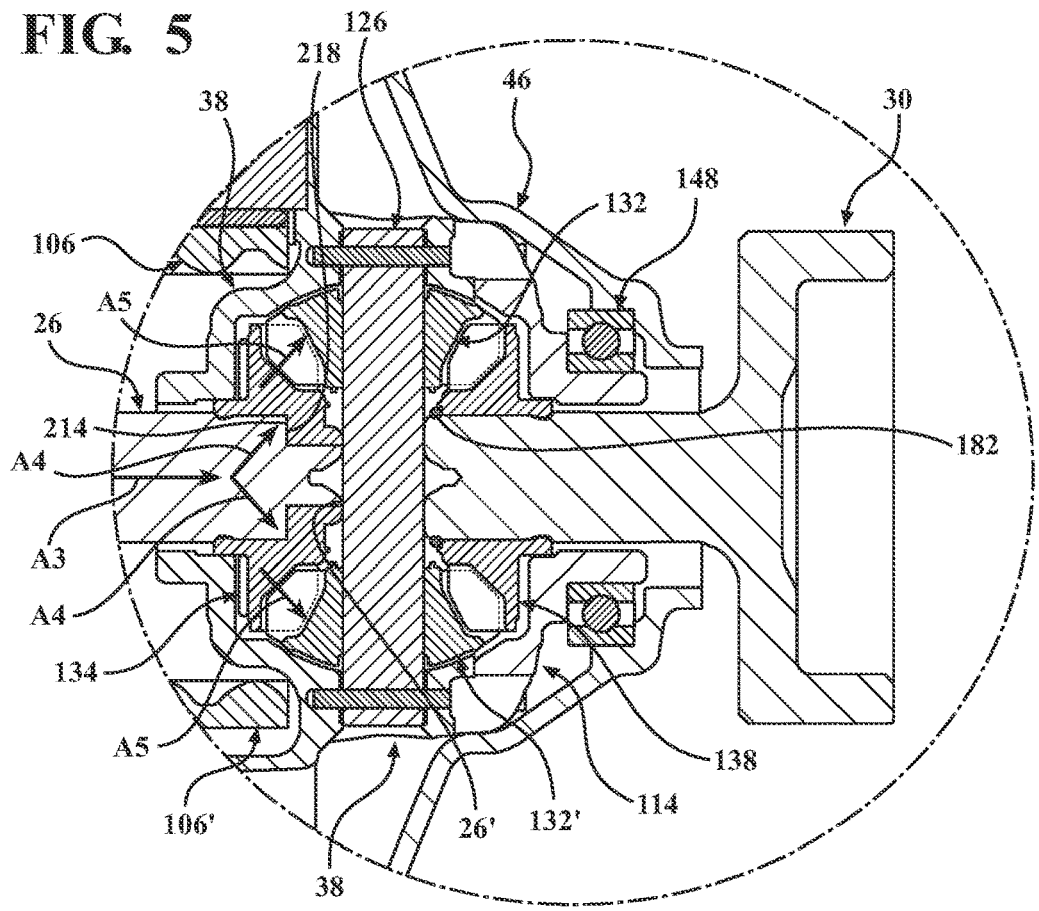
FIG. 5 is an enlarged view of portion 5 of FIG. 3, illustrating the linkshaft bottoming out in a differential side gear.

A second embodiment of a coaxial electrified drive axle 10' is shown in FIGS. 3-5. Elements in FIGS. 3-5 that are the same or similar to those used above in the embodiment shown in FIG. 1 have the same reference numbers for simplicity. Enlarged views of portions 4 and 5 of FIG. 3 are shown in FIGS. 4 and 5, respectively. Only the significant differences in relation to the embodiment shown in FIG. 1 are highlighted below. One difference substantially involves the linkshaft bearing 158' being a floating bearing in combination with the linkshaft 26 bottoming out in the inboard differential side gear 134.

The coaxial electrified drive axle 10' of FIG. 3 lacks the conventional inboard carrier support bearing 183 of FIG. 2 positioned between the carrier inboard rim 146' and the motor housing inboard rim 154.

The second embodiment shown in FIGS. 3 and 4 includes a floating linkshaft bearing 158' with a linkshaft bearing preload spring 174 positioned between the end cover 170 and the floating linkshaft bearing 158'. As shown in FIG. 4, the end cover 170 includes a step 206 sized and shaped to support and retain the linkshaft bearing preload spring 174 against the floating linkshaft bearing 158'. The floating linkshaft bearing 158' is axially retained between the linkshaft retaining ring 172 and the linkshaft bearing preload spring 174. Since the end cover 170 is fixedly coupled to the motor housing 42, the linkshaft bearing preload spring 174 biases the floating linkshaft bearing 158' towards the linkshaft retaining ring 172, applying axial pressure to the linkshaft retaining ring 172 effectively preloading the link shaft bearing 158' against the outboard carrier support bearing 148.

Also shown in FIG. 4, the first outboard motor bearing 70 is shown as a floating bearing with a motor bearing preload spring 210 operatively coupled between the first outboard motor bearing 70 and the recessed cavity 72 in the first end wall 54 of the motor housing 42.

Referring to FIGS. 3 and 5, the first shaft end 26' of the linkshaft 26 includes a step 214 configured to rest against a shoulder 218 within the differential inboard side gear 134. Preferably, the linkshaft 26 bottoms out in the differential inboard side gear 134. Alternatively, the first shaft end 26' of the linkshaft 26 can be coupled to the differential inboard side gear 134 by a c-clip. The linkshaft 26 is held in contact with the differential inboard side gear 134 by preload force A1 applied by the linkshaft bearing preload spring 174.

Referring to FIG. 4, the linkshaft bearing preload spring 174 applies a preload force A1 that goes through the linkshaft bearing 158' (arrow A2) and into the linkshaft 26 (arrow A3). More specifically, the linkshaft bearing preload spring 174 biases the linkshaft bearing 158' towards the linkshaft retaining ring 172, transferring the preload force A1 into the linkshaft retaining ring 172. Since the linkshaft retaining ring 172 is coupled to the linkshaft 26, the preload force A1 is transferred to the linkshaft 26, as illustrated by arrow A2. As shown in FIGS. 4 and 5, the preload force A1 applied to the linkshaft 26 is transferred along the linkshaft 26, as illustrated by arrow A3. Referring to FIG. 5, since the linkshaft 26 is bottomed out in the differential inboard side gear 134, the preload force A1 is transferred into the differential inboard side gear 134 (arrow A4) and through the differential pinion gears 132, 132' (arrow A5). Thus, the preload force A1 from the linkshaft bearing preload spring 174 is transferred through the differential inboard side gear 134 and through the differential assembly 38 and outboard carrier support bearing 148 into the housing 46.

The single carrier support bearing 148 of the second embodiment shown in FIGS. 3-5 is optionally a fixed bearing such as a four point contact ball bearing as shown in FIG. 1.

Optionally, the stepped planetary gears 94, 94' are designed to maintain a relatively low net axial force towards the single carrier support bearing 148 to minimize noise and vibration and to minimize wear and friction loss through thrush washers between rotating components.

One benefit of the coaxial electrified drive axle having a single carrier support bearing is a reduction in cost. A second benefit is the potential to reduce the size of the coaxial electrified drive axle in the axial direction. A third benefit is elimination of the inboard carrier support bearing while controlling axial fixation of the carrier in both directions with the outboard carrier support bearing while maintaining a minimal amount of axial end play within the outboard carrier support bearing. A fourth benefit is the amount of noise, vibration, and bearing wear can be maintained within target amounts when the coaxial electrified drive axle includes a single carrier support bearing.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A coaxial electrified drive axle for a vehicle, comprising:
   a gearbox housing;
   a ring gear supported by said gearbox housing;
   a carrier rotatably supported within said gearbox housing by a carrier support bearing, said carrier having an outboard end spaced apart from an inboard end, said outboard end supported and contained within said gearbox housing by said carrier support bearing and said inboard end spaced apart from said gearbox housing;
   a stepped planetary gear set comprising a plurality of stepped planetary gears, each of said plurality of stepped planetary gears comprising a driven planet gear axially connected to a driving planet gear, each of said plurality of stepped planetary gears rotatably supported by a planet pin, each of said planet pins mechanically coupled to said carrier, said driving planet gears meshingly engaged with said ring gear, and said driven planet gears meshingly engaged with a sun gear;
   an electric motor including a motor housing fixedly coupled to said gearbox housing, a stator fixedly coupled to said motor housing, a rotor positioned within a passageway through said stator, and a drive shaft extending from said rotor, said drive shaft having a first longitudinal bore aligned with an axis of rotation of said drive shaft and extending between opposing first and second ends of said drive shaft, and the first end of said drive shaft fixedly coupled to said sun gear with said first longitudinal bore through said drive shaft aligned with a second longitudinal bore through said sun gear with an axis of rotation of said sun gear aligned with said axis of rotation of said drive shaft;
   a differential assembly supported and contained within said carrier, said differential assembly comprising opposing first and second pinion gears, opposing inboard and outboard side gears meshingly engaged with said first and second pinion gears, and a differential pin passing axially through said first and second pinion gears with opposing ends of said differential pin fixedly coupled to said carrier;

a linkshaft passing longitudinally through said drive shaft and said sun gear, said linkshaft having a first end rotatably connected to said inboard side gear; and an output shaft passing through a first opening in said gearbox housing, said output shaft having a first end axially and rotatably connected to said outboard side gear, wherein said inboard end of said carrier is radially and axially spaced apart from said motor housing by a cavity with said inboard end of said carrier being unsupported by said motor housing through said cavity; and wherein said inboard end of said carrier comprises an inboard rim free of any contact with a bearing.

2. The coaxial electrified drive axle of claim 1, wherein:
said outboard end of said carrier including an outboard opening; and
said output shaft passing axially through said outboard opening.

3. The coaxial electrified drive axle of claim 2, wherein:
said inboard end of said carrier including an inboard opening; and
said linkshaft passing axially through said inboard opening.

4. The coaxial electrified drive axle of claim 3, wherein:
said carrier support bearing is a fixed bearing.

5. The coaxial electrified drive axle of claim 4, wherein:
said carrier support bearing is a four point contact ball bearing.

6. The coaxial electrified drive axle of claim 3, wherein:
said carrier support bearing is a floating bearing.

7. The coaxial electrified drive axle of claim 4, wherein:
said linkshaft supported within said motor housing by a linkshaft bearing; and
said linkshaft bearing is a fixed bearing.

8. The coaxial electrified drive axle of claim 4 or claim 6, wherein:
said linkshaft supported within said motor housing by a linkshaft bearing; and
said linkshaft bearing is a floating bearing.

9. The coaxial electrified drive axle of claim 8, wherein:
said linkshaft bearing axially preloaded by a spring between said motor housing and an outer ring of said linkshaft bearing; and
said linkshaft axially fixed to an inner ring of said linkshaft bearing by a shoulder and/or a retaining ring.

10. The coaxial electrified drive axle of claim 9, wherein:
said first end of said linkshaft including a step configured to matingly engage with a shoulder of said inboard side gear.

11. A coaxial electrified drive axle for a vehicle, comprising:
a gearbox housing having an outboard opening;
a ring gear supported by said gearbox housing;
a carrier supported and contained within said gearbox housing by a carrier support bearing, said carrier having an outboard end rotatably supported within said gearbox housing by said carrier support bearing, said carrier including an inboard end spaced axially apart from an outboard end and spaced axially apart from said carrier support bearing;

a stepped planetary gear set comprising a sun gear and a plurality of stepped planetary gears, said sun gear having a first longitudinal bore extending axially therethrough, each of said plurality of stepped planetary gears comprising a driven planet gear axially connected to a driving planet gear, each of said plurality of stepped planetary gears rotatably supported by a planet pin mechanically coupled to said carrier, wherein said driving planet gears are meshingly engaged with said ring gear and said driven planet gears are meshingly engaged with said sun gear;

an electric motor including a motor housing having an outer wall extending axially between a first end wall and a second end wall, wherein said outer wall is fixedly coupled to said gearbox housing, said second end wall is spaced axially between said first end wall and said gearbox housing, and said second end wall includes an opening extending axially therethrough;

said electric motor also including a stator fixedly coupled to said outer wall spaced axially between said first and second end walls and having a passageway extending axially therethrough, a rotor positioned within said passageway, and a drive shaft extending axially from said rotor and defining an axis of rotation, said drive shaft extending at least partially through said opening in said second end wall, said drive shaft having a second longitudinal bore extending axially therethrough, said drive shaft fixedly coupled to said sun gear with an axis of rotation of said sun gear aligned with said axis of rotation of said drive shaft;

a differential assembly supported and contained within said carrier, said differential assembly comprising opposing first and second pinion gears, opposing inboard and outboard side gears meshingly engaged with said first and second pinion gears, and a differential pin passing axially through said first and second pinion gears with opposing ends of said differential pin fixedly coupled to said carrier;

a linkshaft passing longitudinally through said first and second longitudinal bores through said sun gear and said drive shaft, respectively, and said linkshaft having a first end rotatably connected to said inboard side gear; and an output shaft passing through said outboard opening in said gearbox housing, said output shaft having a first end axially and rotatably connected to said outboard side gear;

wherein said inboard end of said carrier is radially and axially spaced apart from said second end wall of said motor housing by a cavity with said inboard end of said carrier directly unsupported by said second end wall of said motor housing through said cavity; and wherein said inboard end of said carrier comprises an inboard rim free of any contact with a bearing.

* * * * *